United States Patent [19]

Suzuki

[11] Patent Number: 4,703,241
[45] Date of Patent: Oct. 27, 1987

[54] MOTOR SERVO SYSTEM

[75] Inventor: Nobuhiro Suzuki, Mobara, Japan

[73] Assignee: Futaba Denshi Kogyo Kabushiki Kaisha, Mobara, Japan

[21] Appl. No.: 807,742

[22] Filed: Dec. 11, 1985

[30] Foreign Application Priority Data

Dec. 20, 1984 [JP] Japan .................. 59-270028

[51] Int. Cl.⁴ .............................. G05B 11/28
[52] U.S. Cl. ...................... 318/599; 318/341
[58] Field of Search ................. 318/599, 341

[56] References Cited

U.S. PATENT DOCUMENTS 4,295,082 10/1981 Moto et al. ............... 318/599
4,383,245 5/1983 Cooley et al. ........... 318/599 X Primary Examiner—William M. Shoop, Jr.
Assistant Examiner—Saul M. Bergmann
Attorney, Agent, or Firm—Oblon, Fisher, Spivak, McClelland, & Maier

[57] ABSTRACT

A motor servo system is disclosed which is capable of accomplishing the precise control of a set point of a mechanical element to be controlled without particularly considering the mechanical connecting condition between a motor and the mechanical element and being readily accommodated to a variation of the set point and a variation of overshoot due to a variation of load. The motor servo system is constructed in a manner such that a controlled set point of a controlled element such as a mechanical element is independently set by means of a time signal generating section preceding a servo circuit section.

9 Claims, 13 Drawing Figures

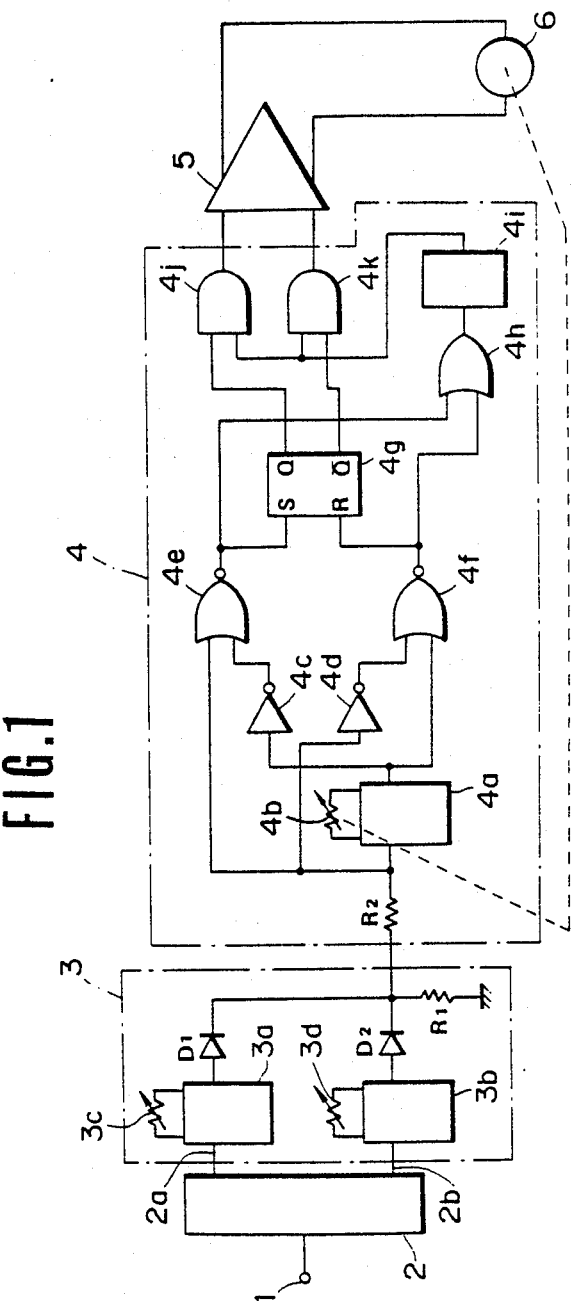
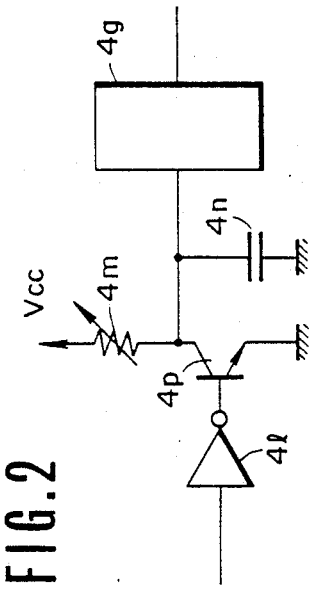
FIG.1
FIG.2

MOTOR SERVO SYSTEM

BACKGROUND OF THE INVENTION

1. Field of the Invention

This invention relates to a motor servo system, and more particularly, a motor servo system which is adapted to carry out a two-position or three-position control of an element to be controlled such as a mechanical element or the like by remote control.

2. Description of the Prior Art

Various kinds of mechanical elements of which a set point to which it is to be moved is predetermined have been conventionally known in the art. For example, a valve mechanism, as shown in FIG. 4, is angularly rotated between 0° and 90° to carry out the passage and shut-off of fluid. Also, in a model airplane controlled by means of a radio control device for remotely controlling a controlled model, a retractable landing gear structure is partially employed which is constructed in a manner to be received in an airframe during the flight as in a real airplane. Such a retractable landing gear is in the category of a mechanical element of which a set point to which it is to be moved is predetermined.

The remote control of such a mechanical element as described above is generally carried out using a servo mechanism. For example, a motor servo circuit for such a retractable landing gear of a model airplane as described above which is remotely controlled by means of a radio control device is constructed in a manner as shown in FIG. 5.

In FIG. 5, reference numeral 51 designates an input terminal to which an input pulse for driving a motor 52 is supplied. More particularly, a pulse which is received and demodulated by a receiver (not shown) and has a pulse width determined depending upon a control input on a transmitter side is supplied in the form of an input signal to the input terminal 51. The input pulse is supplied to a discriminator 53 having an internal reference pulse for discriminating the pulse width. In the discriminator, the input pulse is subjected to judgement as to whether it is a signal for rotating the motor in the right or clockwise direction or in the left or counterclockwise direction based on its pulse width, and is then fed to either an output terminal 53a or an output terminal 53b depending upon the judgement.

Assuming that a difference pulse corresponding to the difference between the input pulse and the internal reference pulse is generated at the output terminal 53a of the discriminator 53 to rotate the motor 52 in the clockwise direction, the difference pulse is subjected to a treatment for suitably extending the pulse width and supplied to a transistor 54a. The difference pulse of which the pulse width has been extended is then fed through an amplifier 55 to the motor 52 to rotate the motor so that a retractable landing gear (not shown) mechanically connected to a revolving shaft of the motor 52 may be received in or drawn out from the body of an airplane.

Also, the revolving shaft of the motor 52 is connected to a movable element 56a of a rotary switch 56. Accordingly, when the movable element 56a is rotated to be contacted with a fixed contact 56b, the base of the transistor 54a is earthed. This results in the transistor 54a being turned off to stop the rotation of the motor 52 to accomplish the movement of the retractable landing gear to a set point. The rotation of the motor 52 in the counterclockwise direction starts when the difference pulse is generated at the output terminal 53b of the discriminator 53, and the retractable landing gear is operated through procedures similar to those described above. In FIG. 5, Vcc designates a driving power source and R designates bias resistances.

The motor servo circuit for operating the mechanical element toward a set point as described above generally employs a system for driving a motor by means of on-off signal of a switch, because it is highly difficult to accomplish the precise coincidence between the operating angle of the mechanical element and the rotating angle of the motor 52. More particularly, the mechanical element stops when it is moved to a set point, and this causes the disagreement between the operating angle of the mechanical element and the rotating angle of the motor, resulting in the supply of an electric current to the motor continuing to incur the waste of power in normal continuous control. Furthermore, the vibration of the mechanical element occurs near the set point due to the overshoot by inertia of the mechanical element or the like.

Thus, the above-described conventional control of a set point of a controlled element such as two-position or three-position control employs on-off control for separating a control loop at the set point or in the vicinity thereof.

However, in order to accomplish the precise control by means of such a conventional system as shown in FIG. 5, it is required to precisely correspond the operating angle of the mechanical element at which the rotary switch 56 is turned on to the width of an input pulse supplied to the input terminal 51. Thus, the conventional motor servo system has a disadvantage that it is highly troublesome to design and construct the rotary switch.

Also, the conventional motor servo system encounters another disadvantage in that the design of the rotary switch 56 must be changed for every variation of the set point of the mechanical element, and any backlash occurring in a power transmission mechanism or the like on the mechanical element side often renders the control according to the width of an input pulse impossible.

Further, in order to overcome the above-described overshoot that is due to inertia of the mechanical element, the conventional system, as shown in FIG. 4, is adapted to interrupt the feed to the motor 52 at the position at which an angle θ is left so that the mechanical element may be moved to the set point by inertia. Nevertheless, such construction of the conventional system still renders the precise presetting of stop position of the motor 52 highly difficult, because the overshoot by inertia of the mechanical element is varied due to a variation of load as well.

In order to eliminate such difficulties as described above, attempts have been made to adjust the mechanical connecting condition between the revolving shaft of the motor and the mechanical element in various ways. However, this is highly troublesome sufficient to render the precise adjustment substantially impossible.

SUMMARY OF THE INVENTION

The present invention has been made in view of the foregoing disadvantages of the prior art.

Accordingly, it is an object of the present invention to provide a motor servo system which is capable of carrying out the precise control of a set point of a controlled element such as a mechanical element without particularly considering the mechanical connecting condition between a motor and the controlled element.

It is another object of the present invention to provide a motor servo system which is capable of being readily accommodated to a variation of a set point of a controlled element.

It is a further object of the present invention to provide a motor servo system which is capable of being readily accommodated to a variation of overshoot due to a variation of load or the like.

It is still another object of the present invention to provide a motor servo system which is capable of accomplishing the above-described objects with a simple structure.

Generally speaking, in accordance with the present invention, there is provided a motor servo system which comprises a discriminator for selecting a set point of a controlled element depending upon an input signal and a time signal generating section comprising, for example, a plurality of monostable multivibrators (hereinafter referred to as "mono-multi elements") which are capable of variably adjusting the width of its output pulse triggered depending upon each output of the discriminator.

A motor is driven following the width of each output pulse of the time signal generating section so that the driving of the motor may be electrically adjustable on a motor servo circuit section side. Also, the present invention is constructed to introduce a pulse for driving the motor into a dead zone setting section once, wherein the movement of an element to be controlled such as a mechanical element corresponding to overshoot due to inertia of the controlled element or the like is set.

In accordance with the present invention, there is provided a motor servo system for controlling a controlled element to a predetermined position depending upon a control input comprising a discriminator for receiving an input signal to discriminate a controlled direction and a controlled set point of said controlled element, a time signal generating section provided corresponding to each output of said discriminator to generate a pulse signal having a time width depending upon the target movement of said controlled element, a servo circuit section for comparing the output of said time signal generating section with a signal corresponding to the movement of said controlled element to generate a signal for driving said controlled element until both agree with each other, and a motor rotated by means of the output of said servo circuit section to drive said controlled element.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals designate like or corresponding parts throughout; wherein:

FIG. 1 is a circuit diagram showing an embodiment of a motor servo system according to the present invention;

FIG. 2 is a circuit diagram showing the essential part of the motor servo system shown in FIG. 1;

DETAILED DESCRIPTION OF THE PREFERRED EMBODIMENT

Figure 3:
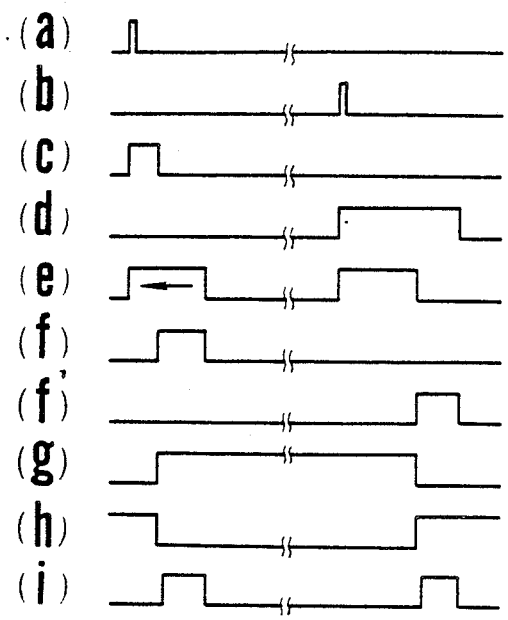
FIGS. 3(a) to 3(i) each are a diagrammatic view showing the operation of the motor servo system shown in FIG. 1.
Figure 4:
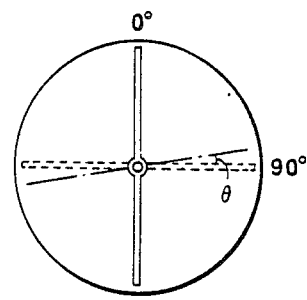
FIG. 4 is a diagrammatic view showing the movement of a controlled element.
Figure 5:
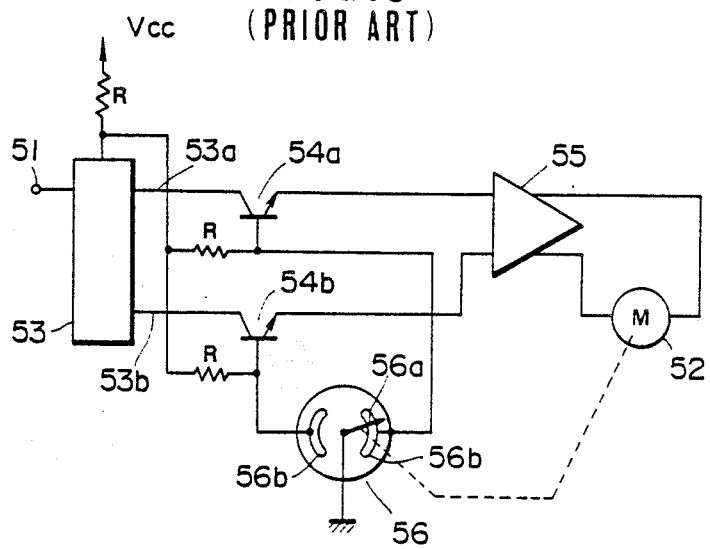
FIG. 5 is a circuit diagram showing a conventional motor servo system.

Now, a motor servo system according to the present invention will be described hereinafter with reference to the accompanying drawings.

FIG. 1 shows a circuit structure of an embodiment of a motor servo system according to the present invention.

In FIG. 1, reference numeral 1 designates an input terminal to which an input signal for indicating a direction in which a mechanical element (not shown) is to be driven is supplied. Reference numeral 2 indicates a discriminator for reading the level and pulse width of the input signal supplied to the input terminal 1 and the like to discriminate the driving or rotating direction of the mechanical element and generating at either an output terminal 2a or an output terminal 2b a trigger signal which is to be supplied to a mono-multi section 3.

In the illustrated embodiment, the discriminator 2 is adapted to discriminate only the rotating direction of the motor described below. Accordingly, it has two types of outputs. However, it is a matter of course that if the number of set points of the mechanical element to be controlled is three, the discriminator is constructed to generate three types of outputs and so on.

The mono-multi section 3 includes a mono-multi elements 3a and 3b provided corresponding in number to the outputs of the discriminator 2. The mono-multi elements 3a and 3b have variable resistors 3c and 3d to each of them respectively. The variable resistors 3c and 3d each serve to adjust the time constant of the corresponding mono-multi element and to vary the width of an output pulse from the respective mono-multi element. The output of each of the mono-multi elements 3a and 3b is introduced to a single common output passage through the corresponding diode D1 or D2 and a resistor R1 of which one end is grounded, and then supplied to a servo circuit section 4.

The present invention may employ any one of servo circuit sections constructed in various ways. In the illustrated embodiment, the servo circuit section 4 is constructed in the following manner.

Reference numeral 4a designates a mono-multi element of which an output pulse has a pulse width adjusted by means of a variable resistor 4b connected thereto. The output of the mono-multi element 4a is supplied to an exclusive OR circuit comprising NOT circuits 4c and 4d and NOR circuits 4e and 4f, together with the output of the mono-multi section 3 supplied through a resistor R2. The exclusive OR circuit judges the relative magnitude in width between both output pulses to generate its output. The output of the exclusive OR circuit causes a flip-flop circuit 4g to be set or reset to regulate the rotating direction of the motor. Reference numeral 4h indicates an OR circuit for taking OR between the NOR circuits 4e and 4f, and the output of the OR circuit 4h is fed through a dead zone setting section 4i to AND circuits 4j and 4k, which selectively generate a signal for driving the motor depending upon the setting or resetting of the flip-flop circuit 4g, and this signal is then supplied to a subsequent step.

In this instance, the dead zone setting section 4i acts to set a period of time for stopping the motor at the time when the mechanical element to be controlled is moved in the vicinity of a set point and subsequently moving the mechanical element to the set point by inertia. FIG. 2 shows one example of a circuit for the dead zone setting section 4i. In the circuit shown in FIG. 2, the output of the OR circuit 4h is reversed at a NOT circuit 4l and then supplied to an integrating circuit comprising a variable resistor 4m, a capacitor 4n and a transistor 4p. Normally, the transistor 4p which forms a discharge passage for the capacitor 4n is turned off by means of the NOT circuit 4l when the output of the OR circuit 4h is generated so that the capacitor 4n may be charged through the variable resistor 4m by means of a power source Vcc. The output of the capacitor 4n charged is subjected to wave shaping at a Schmitt trigger circuit 4g. Accordingly, the adjustment of the variable resistor 4m causes the charging time constant of the capacitor 4n to be varied so that the lower limit of width of the output pulse of the OR circuit 4h to be transmitted to the AND circuits 4i and 4k may be set, to thereby render the formation of a dead zone in the dead zone setting section possible.

The motor servo system of the embodiment illustrated in FIG. 1 also includes a servo amplifier 5. The motor is designated by reference numeral 6. The motor 6 is connected to not only the mechanical element (not shown) but a movable element of the variable resistor 4b attached to the monomulti element 4a. Thus, a servo system of the feedback type is formed.

Now, the manner of operation of the motor servo system of the illustrated embodiment constructed as described above will be described hereinafter.

First, to the input terminal 1 is supplied a signal which indicates the rotating direction of the motor 6. The signal is read by the discriminator 2, which then generates a trigger signal at either the output terminal 2a or the output terminal 2b.

For example, when such a trigger signal as shown in FIG. 3(a) is generated at the output terminal 2a, the mono-multi element 3a generates such a pulse, as shown in FIG. 3(c) which has a pulse width defined by the variable resistor 3c. The width of the pulse generated from the mono-multi-element 3a is determined by the variable resistor 3c corresponding to the rotating angle of the motor 6 which is driven to move the mechanical element in one direction, for example, to receive a retractable landing gear in an airframe.

The output of the mono-multi element 3a is supplied to the mono-multi element 4a of the servo circuit section 4 through the diode D1 and resistor R2 to trigger it, to thereby cause it to generate such a pulse signal as shown in FIG. 3(e), and the pulse signal is then supplied to the NOR circuit 4e. Concurrently, to the NOR circuit 4e is introduced or supplied a reverse output generated from the mono-multi element 4a. Thus, the NOR circuit 4e generates such a NOR output as shown in FIG. 3(f) for only a period of time during which both inputs of the NOR circuit are "O", and the NOR output is then supplied to a set terminal S of the flip-flop circuit 4g, which generates a set output Q which rises as shown in FIG. 3(g).

The output of the NOR circuit 4e is supplied through the OR circuit 4h to the dead zone setting section 4i, in which the output is treated to be shortened by time corresponding to the movement of the mechanical element by inertia to have such a waveform as shown in FIG. 3(i) and then supplied through the AND circuit 4j to the servo amplifier 5.

Thus, the motor 6 is driven so that the mechanical element mechanically connected to the revolving shaft of the motor 6 may be controlled. Concurrently, the motor 6 rotates the movable element of the movable resistor 4b attached to the mono-multi element 4a, which generates an output having such a width as narrowed in the direction as indicated by an arrow in FIG. 3(e).

When such operation is continued over several cycles, the width of the output generated from the mono-multi element 4a approaches that of the output of the mono-multi element 3c shown in FIG. 3(c), and when the width of a pulse of time difference between both output pulses is introduced into the dead zone set in the dead zone setting section 4i, the supply of a driving signal to the motor 6 is stopped. Thereafter, the mechanical element is moved to a set point by inertia.

Also, when a trigger signal as shown in FIG. 3(b) is supplied to the mono-multi element 3b by the discriminator 2, the output of the mono-multi element 3b shown in FIG. 3(d) is supplied through the mono-multi element 4a and NOT circuit 4d to the NOR circuit 4f so that it may generate a pulse shown in FIG. 3(f') which corresponds to the difference between the output of the mono-multi element 3b and the output of the mono-multi element 4a shown in FIG. 3(e). The output of the NOR circuit 4f thus generated causes an output generated at a terminal $\overline{Q}$ of the flip-flop circuit 4g to rise as shown in FIG. 3(h), and the output whose pulse width is adjusted at the OR circuit 4h and dead zone setting section 4i is supplied through the AND circuit 4k (FIG. 3(i)) to the servo amplifier 5, to thereby control the movement of the mechanical element in a manner as described above.

Thus, in either case, the rotating angle of the motor 6 is regulated by the width of the pulse generated from each of the mono-multi elements 3a and 3b. Accordingly, it is not required to particularly consider the mechanical connecting condition between the motor 6 and the mechanical element. This indicates that the adjustment of outputs of the mono-multi elements 3a and 3b depending upon the mechanical connecting condition between the motor and the mechanical element accomplishes the precise control of a set point.

Thus, the illustrated embodiment is constructed in the manner that the adjusting operation required for the precise control of a set point of the mechanical element is borne on the side of mono-multi elements 3a and 3b, to thereby highly facilitate the adjusting operation. This also indicates that such construction of the illustrated embodiment is readily accommodated to a variation of a set point of the mechanical element.

Further, in the illustrated embodiment, the dead zone setting section is provided which is capable of setting its dead zone as desired. Such construction allows timing for driving and stopping the motor to be set depending upon the loaded condition and the mechanical connecting condition between the motor and mechanical element so as to correspond to the overshoot of control by inertia or the like, to thereby accomplish the precise control and prevent the vibration of the mechanical element in the vicinity of the set point and the consumption of power.

In the embodiment described above, the discriminator 2 is adapted to discriminate only the rotating direction of the motor 6. This requires the use of the mono-multi section including only two mono-multi elements. When the number of set points is three, it is merely required to provide a mono-multi section having mono-multi elements corresponding in number to the set points. The input signal used for the selection of a set point may be in the form of any signal such as a pulse signal, an on-off signal of a switch, a digital signal given by means of a BCD code or the like. The discriminator 2 is varied in structure depending upon the input signal.

The time signal generating section, servo circuit section, dead zone setting section and the like in the embodiment may be modified in various ways as desired.

As can be seen from the foregoing, the present invention is constructed to independently set a set point of a mechanical element to be controlled by means of a time signal generating section provided at the stage preceding the servo circuit section.

Accordingly, the present invention can readily and precisely set the movement of the mechanical element to be controlled to a set point on the side of the time signal generating section without requiring the adjustment on the side of the mechanical connecting mechanism between the motor and the mechanical element to be controlled.

Also, the present invention can set optionally and precisely set timing for driving and stopping the motor in view of a variation of a set point or mechanical inertia depending upon the circumstances on the side of the object to be controlled. Accordingly, it may effectively accomplish the control of a set point of various apparatus.

While a preferred embodiment of the invention has been described with a certain degree of particularity with reference to the drawings, obvious modifications and variations are possible in the light of the above teachings. It is therefore to be understood that within the scope of the appended claims, the invention may be practiced otherwise than as specifically described.

What is claimed as new and desired to be secured by letters patent of the United States is:

1. A motor servo system for controlling a controlled element to a predetermined position comprising:
    a discriminator having a plurality of output terminals, said discriminator generating a signal indicative of a controlled direction and/or a controlled set point of said controlled element selectively at any one of said output terminals in response to an input signal indicative of the direction of desired movement of said controlled element;
    a plurality of time signal generating sections connected to each output terminal of said discriminator to generate a pulse signal having a variable time width depending upon a target movement of said controlled element;
    a servo circuit section including an error pulse generating section for comparing a pulse signal of a time signal generating section with a signal corresponding to the movement of said controlled element to generate an error pulse and a driving circuit section for generating a signal to drive said control element until the error pulse reaches a predetermined value; and
    a motor rotated by the output signal of said servo circuit section to drive said control element.

2. A motor servo system as defined in claim 1, wherein said time signal generating sections each includes a monostable multivibrator having an adjustable time constant circuit to vary the output pulse width of said monostable multivibrator.

3. A motor servo system as defined in claim 2, wherein said monostable multivibrator has a variable time constant circuit and a variable resistor for adjusting said variable time constant of said monostable multivibrator that varies the output pulse width of said monostable multivibrator.

4. A motor servo system as defined in claim 1, wherein said servo circuit section includes a nonostable multivibrator connected to said time signal generating section, said monostable multivibrator having an adjustable time constant circuit which varies said monostable multivibrator's output pulse width.

5. A motor servo system as defined in claim 4, wherein said monostable multivibrator is provided with a variable resistor for adjusting the time constant of said monostable multivibrator thereby varying the output pulse width of said monostable multivibrator.

6. A motor servo system as defined in claim 5, wherein a movable element of said variable resistor is connected to said motor.

7. A motor servo system as defined in claim 1, wherein said driving circuit section further comprises a dead zone setting section for generating a signal to drive said control element until the width of said error pulse agrees with a setting width of said dead zone.

8. A motor servo system as defined in claim 7, wherein said dead zone setting section comprises:
    a NOT circuit coupled to said NOT circuit, an integrating circuit including a variable resistor, a capacitor and a transistor, and a Schmitt trigger circuit.

9. A motor servo system as defined in claim 1, wherein said servo circuit section comprises: a monostable multivibrator connected to said time signal generating section;
    a variable resistor for adjusting the output pulse width of said monostable multivibrator, an exclusive OR circuit comprised of NOT circuits and NOR circuits, said OR circuit determining the relative magnitude of the output pulse width of said time signal generating section and said monostable multivibrator;
    a flip-flop coupled to said NOR circuits and placed in the set or reset state in response to the output of said NOR circuits for regulating a rotating direction of said motor, an OR circuit having its input connected to the output of said NOR circuits;
    a dead zone setting section connected to said OR circuit; and
    AND circuits connected to said flip-flop and said dead zone setting section for generating a signal for driving said motor in response to the set or reset state of said flip-flop circuit.

* * * * *